B. BURTON.
BREECH LOADING FIREARM.
No. 3,699. Reissued Nov. 2, 1869.
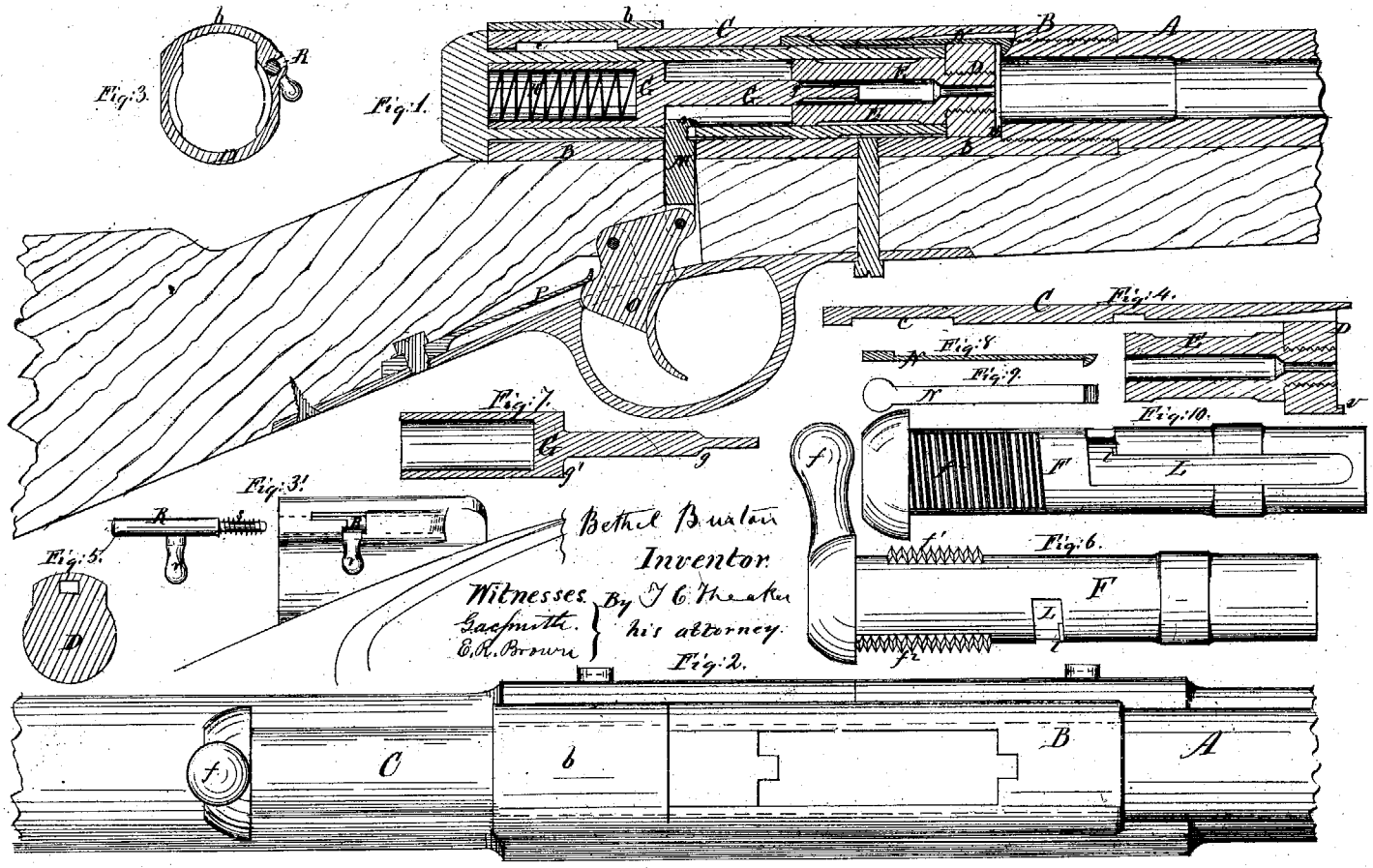
THE NORRIS PETERS CO., PHOTO-LITHO., WASHINGTON, D. C.

UNITED STATES PATENT OFFICE.

BETHEL BURTON, OF BROOKLYN, AND WILLIAM G. WARD, OF NEW YORK, N. Y., ASSIGNEES OF BETHEL BURTON.

IMPROVEMENT IN BREECH-LOADING FIRE-ARMS.

Specification forming part of Letters Patent No. 81,059, dated August 11, 1868; Reissue No. 3,699, dated November 2, 1869.

*To all whom it may concern:*

Be it known that BETHEL BURTON, of Brooklyn, in the county of Kings and State of New York, has invented certain new and useful Improvements in Breech-Loading Fire-Arms; and we do hereby declare that the following is a full, clear, and exact description thereof, reference being had to the accompanying drawings, making part of this specification, and to the letters of reference marked thereon.

The nature of the invention consists in, first, a slide or cover of peculiar construction, and its combination with a sliding breech-pin; second, a breech piece or receiver formed with a ring or enlargement at its rear end and with a recess to allow the slide or cover to pass under said ring; third, an opening in the top of the breech-piece formed with vertical walls or sides; fourth, forming the slide or cover with a recoil-block and attaching to it a steady-pin; fifth, forming the slide or cover with a groove or recess for holding the cartridge-extractor in place without the aid of screws or other fastenings; sixth, making the hammer and firing-pin all in one piece, and formed with a beveled shoulder for the purpose of lessening the wear; seventh, so arranging the firing-pin with relation to the extractor and the recoil-block and steady-pin as to eject the cartridge from the breech-piece during the backward movement of the slide or cover; eighth, forming an L-shaped slot in the breech-pin to serve as a guide, and to secure safety; ninth, forming a hook on the upper end of the trigger-bolt for engagement with a lip or cam in the L-shaped slot of the breech-pin; tenth, providing a safety-bolt to prevent the accidental discharge of the piece.

To enable those skilled in the art to which the invention appertains to make and use the same, we will proceed to describe its construction and operation.

In the drawings, Figure 1 is a longitudinal vertical section of the improved fire-arm at the breech. Fig. 2 is a plan or top view of the same with the breech-pin drawn back. Fig. 3 is a transverse vertical section of the rear end of the breech. Fig. 3′ is a side elevation of the same, showing the bolt which locks the breech-pin with the bolt detached. Fig. 4 is a section of a slide or cover, recoil-block, and steady-pin. Fig. 5 is a transverse section of the recoil-block and slide or cover. Fig. 6 is a side view of the breech-pin. Fig. 7 is a sectional view of the hammer and firing-pin. Fig. 8 is a sectional view of the cartridge-extractor. Fig. 9 is a plan view of the same. Fig. 10 is a view of the under side of the breech-pin.

To the rear end of the barrel A is attached a breech-piece or receiver, B, the rear end of which is formed with an enlargement or ring, *b*. A portion of the upper side of the breech-piece B is cut away, so as to form a longitudinal slot or mortise extending from near the rear end of the barrel A back to and running under the ring *b*, the under side of which is cut away so as to form a recess to allow the slide or cover to move back and forward with the breech-pin. The sides of the opening in the breech-piece are then cut away, so as to form vertical walls. The slide or cover C is formed with a recess, *c*, (see Figs. 1 and 4,) on the under side near the rear end, and on the front end is a recoil-block, D, which is made in one piece with the slide.

On the under side of the slide or cover C is a slot or groove corresponding with the form and thickness of the extractor N, by which means the extractor is held in place without the aid of screws or other fastenings. It is also completely covered by the slide or cover and protected from wet and dirt.

Attached to the recoil-block is a steady-pin, E, which extends forward so as to enter the front end of the breech-pin, and is made hollow to receive the front end of the firing-pin, and also serves as a guide for the firing-pin.

The breech-pin F is bored out to within about an eighth of an inch of its base, to receive the hammer and firing-pin G and spiral spring H, and is provided with a lever, *f*, for operating it. On the upper and lower sides of the breech-pin, at its rear end, are sectional screws or cams $f'$ $f^2$, which correspond with similar sectional screws or cams on the right-hand and left-hand sides of the rear end of the breech-piece B, on the inside thereof, substantially as described in my patent of December 20, 1859. The L-shaped slot in the breech-pin F runs longitudinally from near the front end to a short distance beyond the center, where it turns at a right angle and runs transversely for about one-fourth the circumference of the pin. (See L, Figs. 6 and 10.) At the angle of the L-shaped slot, in the transverse portion, is a lip or cam, *l*, which engages with the trigger-bolt, as hereinafter described.

The hammer and firing-pin G is made in one piece, instead of being in two or more, as heretofore, and the rear end is bored out a sufficient depth to receive the spiral spring H. The shoulder *g*, near the front end of the firing-pin, is made beveled, and the shoulder against which it strikes in the steady-pin is of corresponding form, and receives the shock of the hammer when the gun is snapped without a cartridge in the barrel, rendering it less liable to be worn away or broken by frequent concussion than would be the case with a rectangular shoulder. The trigger O and trigger-spring P may be of any ordinary suitable construction.

To the trigger O is pivoted a finger or trigger-bolt, M, which extends vertically upward through a hole in the breech-piece B and engages with the L-shaped slot in the breech-pin F. On the upper end a notch is made, so as to form a hook, *m*, which engages with the lip or cam *l* in the slot L.

The safety-bolt R (Figs. 3 and 3′) works in a casing on the breech-piece B. On the front end is a spiral spring, *s*, which tends to press it toward the rear; and the rear end is made to fit a small hole in the lever *f* of the breech-pin F.

The hammer G and spring H are placed in position in the breech-pin F. The front end of the firing-pin is inserted in the steady-pin E. The breech-pin is then partially rotated, the upper sectional screw or cam, *f′*, entering the recess *c* and connecting the parts together, forming a broken-jointed breech-pin, without the aid of screws or other fastenings, in which condition they are inserted in the breech-piece and compelled to remain and move together back and forward therein, the recess in the ring *b* and the vertical walls of the breech-piece B serving to guide the slide or cover C, and the engagement of the trigger-bolt M with the slot L serving to guide the breech-pin F.

When a cartridge is placed in the receiver B, the breech-pin is pushed forward, closing the breech, pressing the recoil-block against the base or head of the cartridge, and forcing the cartridge home. The lever *f* is then turned down to the right and the piece is ready for firing. During the forward movement of the breech-pin, the rectangular shoulder *g′* on the firing-pin G comes in contact with the trigger-bolt M and is prevented from going any farther forward, by which means the spring H is compressed and held in readiness for firing. When the trigger is pulled, the trigger-bolt drawn down, and the spring H relieved, it forces the hammer forward against the head of the cartridge, by which means the fulminate in the cartridge is ignited. As the lever *f* is being moved down and the breech-pin rotated to the right, the lip or cam *l* in the slot L passes under the hook *m* on the trigger-bolt M, and after the trigger-bolt has been drawn down and the hammer released and driven forward, as the motion of the breech-pin is reversed for the purpose of drawing it back, the lip or cam *l* passes over the upper end of the trigger-bolt.

In order to expel the shell of the cartridge from the breech-piece or receiver when withdrawn from the barrel, a projection, *v*, on the under side of the recoil-block D, Figs. 1 and 4, supports the rim of the cartridge and prevents its dropping down from the hook of the extractor until it clears the end of the barrel, when the pressure exerted by the spring H on the firing-pin against the cartridge-shell tilts it up and out of the receiver.

In order to carry the arm with safety when loaded, it is only necessary to turn the breech-pin until the lip or cam *l* is brought under the hook *m* on the trigger-bolt M, when it is secured, so that the piece cannot be discharged, as the hook *m* passes over the lip or cam *l*, so that the trigger-bolt cannot be pulled down until the breech-pin has been turned sufficiently to bring the lip or cam from under the hook, which allows of the trigger-bolt being drawn down by the action of the trigger.

To hold the breech-pin in position with the lip in contact with the hook, the safety-bolt R is made to engage with the hole in the lever *f* and prevent it from being turned. When the bolt R is not to be used, the handle *r* is turned, so as to engage with a notch in the casing, and is thus held out of the way of the lever.

Having thus described the invention, what is claimed as new, and desired to be secured by Letters Patent, is—

1. A slide or cover with a recess in the under side of the rear end, in combination with a breech-pin provided with sectional screws or cams, substantially as shown and described.

2. A breech piece or receiver formed with a ring or enlargement at its rear end, and with a recess to allow the slide or cover to pass under said ring, substantially as shown and described.

3. An opening in the top of the breech-piece with vertical walls or sides, in combination with a slide or cover formed in one piece with a recoil-block, substantially as shown and described.

4. A recoil-block formed in one piece with the slide and having a steady-pin attached, substantially as shown and described.

5. A groove or recess in the slide or cover, for holding the cartridge-extractor in place without the aid of screws or other fastenings, substantially as shown and described.

6. A hammer and firing-pin formed in one piece, with a beveled shoulder on the front portion, and with a hollow open rear end to receive a spiral spring, substantially as shown and described.

7. The arrangement of the firing-pin with relation to the extractor and the recoil-block and steady-pin, so as to eject the cartridge from the breech-piece during the backward movement of the slide or cover, substantially as shown and described.

8. The combination of a hook on the trigger-bolt with a projection in the L-shaped slot of the breech-pin, as shown and described, for the purpose specified.

9. The safety-bolt R, constructed and arranged as shown and described, for the purpose specified.

10. The combination of the slide or cover C, recoil-block D, steady-pin E, breech-pin F, and sectional screw or cam entering the recess *c*, coupling the parts without the use of a screw or other fastening, and forming a broken-jointed breech-pin, substantially as shown and described.

BETHEL BURTON.
WILLIAM G. WARD.

Witnesses as to signature of Bethel Burton:
F. H. MORSE,
H. KENILWORTH.

Witnesses as to signature of William G. Ward:
ROBERT WILSON, JR.,
H. G. CRAIG.